United States Patent [19]

Schindehütte

[11] 3,988,992
[45] Nov. 2, 1976

[54] HIGH SPEED RAILWAY TRUCK

[75] Inventor: Manfred Schindehütte, Calden, Germany

[73] Assignee: Wegman & Co., Kassel, Germany

[22] Filed: July 24, 1974

[21] Appl. No.: 491,424

[30] Foreign Application Priority Data
July 25, 1973 Germany............................ 2337771

[52] U.S. Cl..................... 105/199 CB; 105/182 R; 105/197 A; 105/199 R; 105/224.1; 295/5; 295/7; 295/11

[51] Int. Cl.².......................... B61F 3/08; B61F 5/10; B61F 5/14; B61F 5/24

[58] Field of Search......... 105/199 R, 124.1, 182 R, 105/197 A, 199 CB, 224.1; 295/5, 7, 11

[56] References Cited
UNITED STATES PATENTS

| 2,113,379 | 4/1938 | Maas.................................... 295/11 |
| 3,818,841 | 6/1974 | Julien............................... 105/182 R |
| 3,839,969 | 10/1974 | Thum............................... 105/224.1 |

Primary Examiner—Robert J. Spar
Assistant Examiner—Howard Beltran
Attorney, Agent, or Firm—Burgess, Dinklage & Sprung

[57] ABSTRACT

A truck for a high speed rail vehicle which has a friction bearing between the car body and the truck frame so as to restrain movement of the frame about its vertical axis until the friction between the friction bearing and the truck frame has been overcome. The truck also has axle bearings in the form of mutually inclined surfaces made of material of high stiffness in the normal direction of travel of the truck.

7 Claims, 5 Drawing Figures

HIGH SPEED RAILWAY TRUCK

BACKGROUND OF THE INVENTION

1. Field of the Invention

This invention relates to a truck for high speed rail vehicles, especially for high speed passenger rail cars, in which the dynamic stability of the wheel sets is assured up to speeds exceeding 124.3 miles per hour (200 kilometers per hour). The term "truck" as used herein refers to the part of the vehicle which contains one or more wheel sets, especially a swivel truck having two or more wheel sets. This invention is particularly directed to a truck in which the wheel sets are guided stiffly in the direction of travel by use of an elastic material having an elastic constant greater than 200 kiloponds per millimeter per axle bearing which is disposed directly on the car body or in a frame which is joined to the car body. The trucks of the invention are further characterized by having a resilient elastic layer disposed between the wheel crown of the wheel and the hub thereof.

2. Discussion of the Prior Art

It is known that high track speeds can be achieved if the pivoting movement of the wheel set or swivel truck, as the case may be, about its vertical axis, is retarded by a stabilizing means. It is also known that the effect of a stabilizing means can be improved if the wheel sets are so mounted in the swivel truck or on the car that movements of the wheel axle bearings in the direction of travel are opposed by great forces, i.e., the elastic constant in the direction of travel is great.

Running speeds of up to 200 km/h can be achieved if, in addition to the axle mounting which is very stiff in the direction of travel, a wheel profile having a shallow conical inclination is used. It has been found, however, that the wheel profile is changed by wear and ultimately assumes a shape that is virtually independent of the initial profile and ceases to be changed by further wear. This constant profile produced by wear, however, has a relatively great effective conical inclination, resulting in an instability of the operation of the wheel set above a certain critical speed. This so-called zigzagging produces very great lateral forces, so that the car can no longer be operated at maximum speeds with this profile due to wear.

To prevent this instability and enable cars to run at maximum speed, the wheel sets have had to be frequently turned or ground down in order to obtain the profile with the shallow conical inclination. The necessity of frequently turning or grinding down the wheel sets, however, is not acceptable in practical operation.

The stabilization of wheel set operation by torsional drag, which has been successful at speeds up to 200 km/h, is no longer sufficient at speeds above 200 km/h and with wheels of worn profile.

It has, therefore, become desirable to provide a truck for a high speed rail vehicle in which there is maximum dynamic stability when the truck moves at speeds exceeding 200 km/h. More especially, it has become desirable to provide a truck in which maximum stabilization of the wheel sets is provided without the so-called zigzagging which produces the great lateral forces in an apparatus which does not require the turning or grinding down of wheel sets. More especially, it has become desirable to provide a truck for a high speed rail vehicle which can be moved at speeds exceeding 124.3 mi/hr (200 km/h) and even at speeds up to 186.4 mi/hr (300 km/hr).

SUMMARY OF THE INVENTION

The objects of the invention are provided by an improved truck for high speed rail vehicles having a frame, at least one wheel set, the wheels of which are joined by an axle, the ends of which are mounted in an axle bearing, said frame supported by a spring support having bearing surfaces, each of said wheels having a wheel crown and a wheel hub, the improvement residing in:

A. a resilient elastic layer disposed between said bearing surfaces having in the direction of travel an elastic constant greater than 200 kp/mm for each axle bearing; and
B. an elastic layer resilient in circumferential direction disposed between said wheel crown and said hub.

In accordance with the present invention additional stabilization of a high speed truck for rail vehicles is provided by increasing the wave length of the sinusoidal motion of the truck at high speeds, which permits the speed to be increased to 300 kilometers per hour even with wheel sets of worn profile. This can be achieved by the invention which is characterized by:

1. Provision for guiding the wheel sets stiffly in the direction of travel, i.e., with a spring constant greater than 200 kiloponds per millimeter (11,115 pounds per inch) per axle bearing either directly on the car body or in a frame joined to the car body by a torsional drag acting against rotation about a vertical axis; and
2. By joining the rims of the wheel hubs resiliently in a circumferential direction.

At the same time, it is important that the wheel sets which are resilient in a circumferential direction cooperate with a mounting in the direction of the travel, and that the action not be defeated by the fact that the stiff mounting is rendered ineffectual by the turning of a truck. The frame in which the axles are carried can be the frame of a swivel truck of two or more axles, or the frame for joining the ends of the cars of a train. Thus, in the simple embodiment, the truck of the present invention can have only a single wheel set. Generally speaking, however, there are two or more axles, i.e., two or more wheel sets as in the case of a railroad truck disposed beneath the body of the railroad car.

BRIEF DESCRIPTION OF DRAWINGS

The present invention can be more readily understood and appreciated when reference is made to the accompanying drawings in which.

DESCRIPTION OF SPECIFIC EMBODIMENTS

Figure 1:
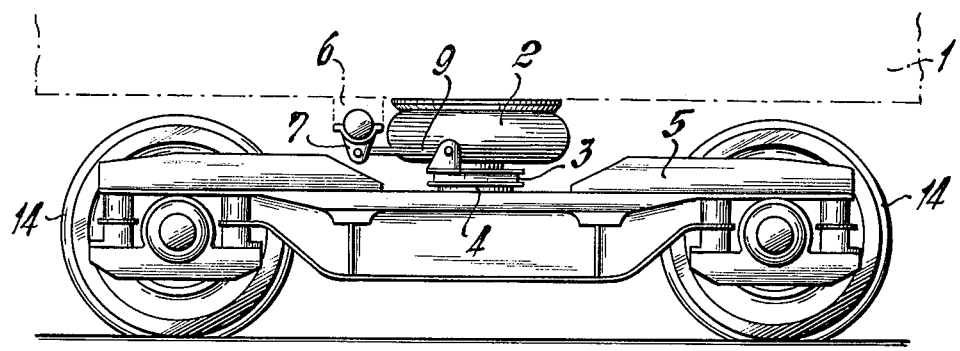
FIG. 1 is a side elevational view of the truck of the invention.

Referring to the accompanying drawings, car body 1 rests by means of air springs 2 on a cross member 3 supported by lateral friction bearings 4 on the swivel truck frame 5. The cross member 3 is connected to the car body by a linkage consisting of the bearings 6 mounted on the car body, the vertical levers 7 which are joined rigidly together by the tube 8, and the horizontal arms 9, which are articulated to the ends of the cross member.

Figure 2:
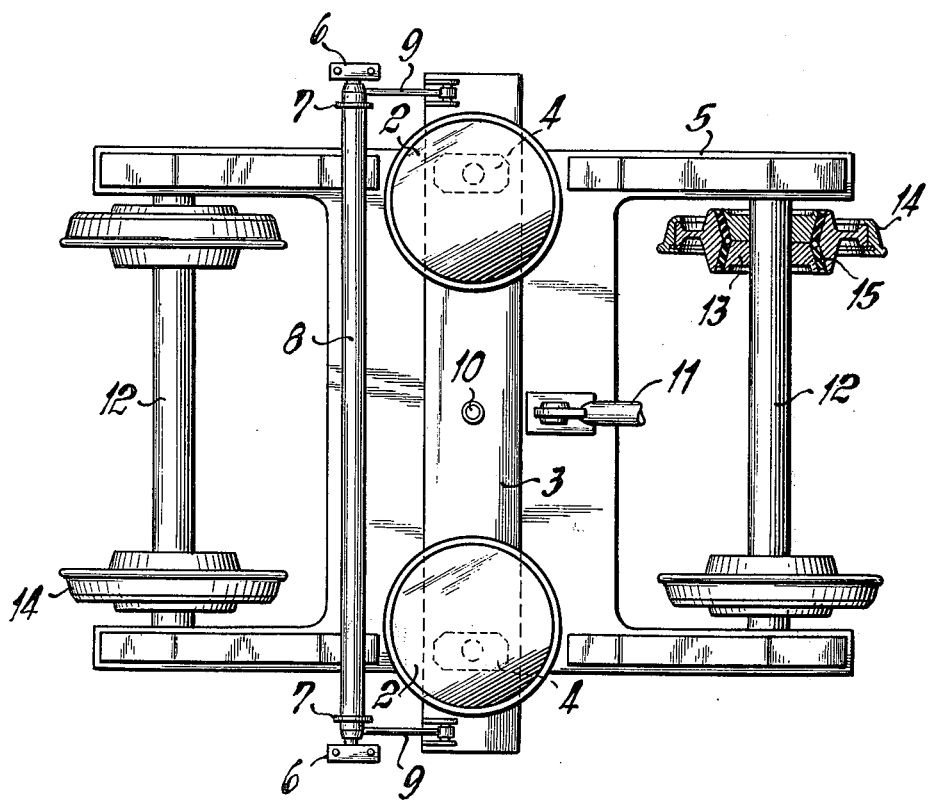
FIG. 2 is a top plan view of the truck of the invention.
Figure 3:
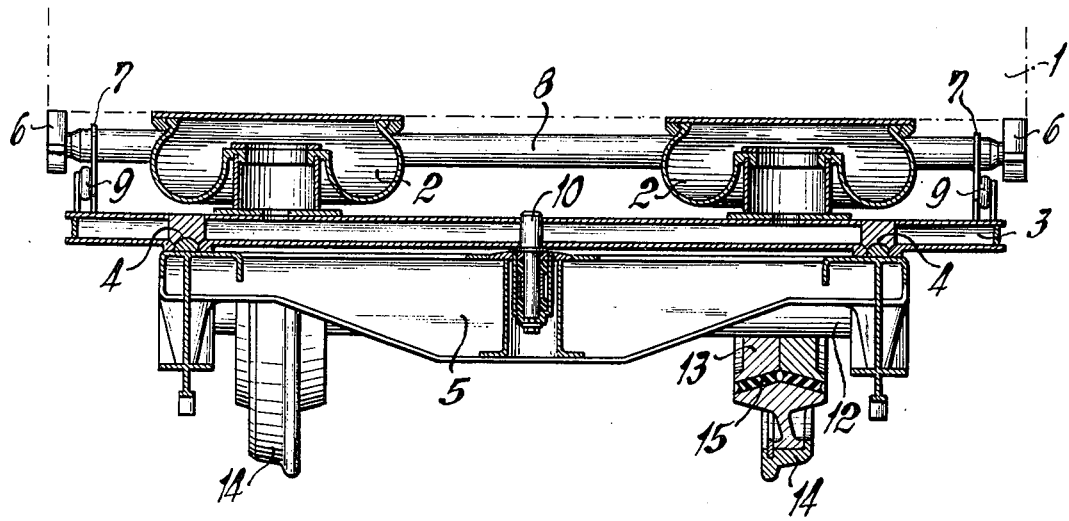
FIG. 3 is a cross-sectional view of the truck of the invention taken through the truck of FIG. 1, representing a vehicle wheel in cross section through its center.

The purpose of the above-described linkage is to prevent any turning of the cross member against the car body without interfering with the action of air springs 2. In the negotiation of curves, the swivel truck frame 5 can turn about its vertical axis overcoming the friction between the friction bearings 4 and the truck frame. The cross member 3 is joined to the truck frame by a centering pin 10 shown in FIGS. 2 and 3, and the longitudinal forces are transmitted from the car body to the truck by a tension rod 11.

According to the invention, each wheel set consists of a wheel axle 12 onto which the hubs 13 are pressed. Each wheel also comprises a wheel crown 14. The wheel hub and wheel crown are made of a hard material, especially steel. Disposed between the hubs 13 and the wheel crowns 14 is an insert 15 of a V-shaped cross section of an elastic resilient material, especially rubber. This insert is disposed such that the ends of the legs of the V which join one another are disposed inwardly towards the center of the axle. This insert insures that the wheel crown will be able to turn by a certain amount in relation to the wheel hub or wheel disc, as the case may be, while the V shape of the insert assures a stiff springing transversely of the direction of travel. By so providing such an insert in such a V shape the track width of the wheel crowns is unable to vary to any appreciable extent during use.

Figure 4:
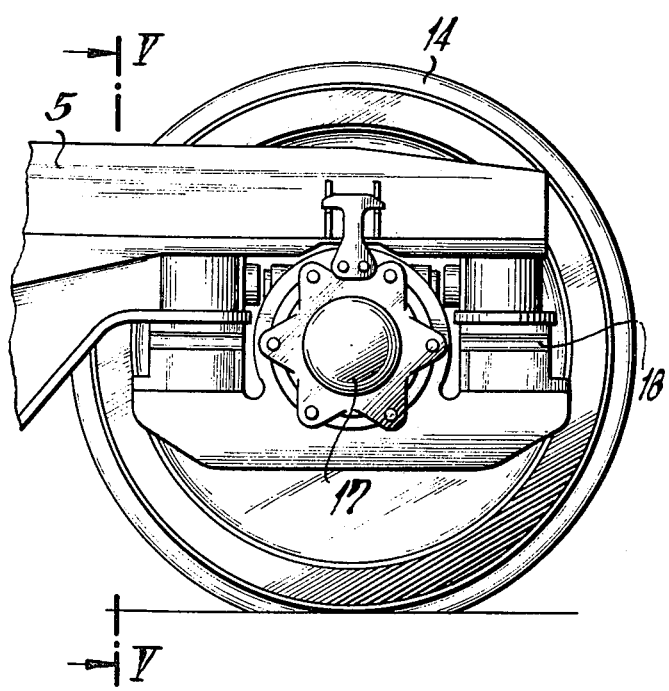
FIG. 4 is a side elevational view of a wheel axle bearing of the swivel truck of FIGS. 1 to 3.
Figure 5:
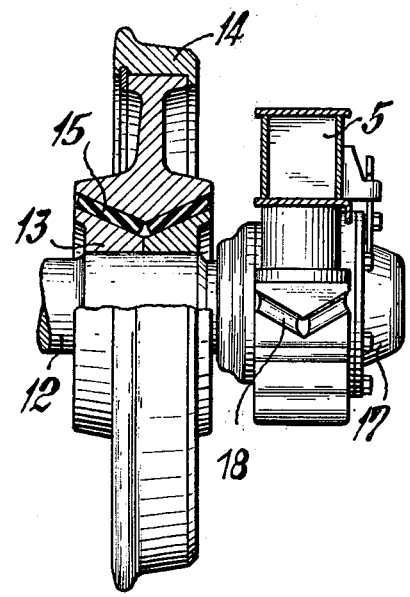
FIG. 5 is a cross section taken along the line V—V in FIG. 4 through the longitudinal member and at the same time, a cross section through the center of the wheel in the vertical radial plane thereof.

The wheel sets are mounted in axle bearings 17 as shown in FIGS. 4 and 5. The axle bearings themselves are supported by spring supports in known manner. Within the spring supports there are mutually inclined bearing surfaces. A rubber elastic layer 18 is disposed between these mutually inclined bearing surfaces. The thickness of the rubber elastic layer 18 is such that the elastic constant in the direction of travel is greater than 200 kiloponds per millimeter. When the elastic constant is about 500 kiloponds per millimeter, a substantial elongation of the wave length of the sinusoidal curve is attained, thereby permitting the rail vehicle to be moved at substantially higher speeds up to 300 kilometers per hour without undesirable zigzag or other uncomfortable motion of the vehicle car.

Generally, speaking, the insert 15 of V-shaped cross section and the insert 18, also of V-shaped cross section, can be replaced by any kind of insert. This applies particularly to the wheel insert 15. Preferably, the insert disposed between the inclined bearing surface in the spring member into which the axle rests is in a V shape, the joint edge of the legs of the V disposed in a right angle to the center of the axle. This is shown in FIG. 5.

The present invention solves the problems encountered in known high speed rail vehicles by a suitable adjustment of the spring constant at the axle bearing in the direction of the travel concommitantly with a suitable adjustment of the spring constant of the wheel in the circumferential direction at the tire surface. The desirable increase of the wave length of the sinusoidal motion can be explained if one considers a system of coordinates, in the case of a rail vehicle travel, where the vehicles direction of travel is represented by the X-axis, the Y-axis being drawn horizontally across the direction of travel and the Z-axis being vertical to the X and Y axes. The wheel set moves at a constant velocity in the direction of X. On this movement, there is superimposed, in the case of sinusoidal motion, a vibration in direction Y and a rotary vibration about the Z-axis.

Assuming for the sake of simplicity that the moment of inertia of the wheel set about the Z-axis is negligible (which, of course, is permissible only in the case of lower speeds) and assuming, furthermore, that no slippage occurs between the wheel and the rail, then, in the event of a disturbance of the wheel set, there is performed a pure sinusoidal movement. This sinusoidal movement has a wave length which can be computed according to the following formula:

$$\lambda = 2\pi \sqrt{\frac{s \cdot r}{2 \cdot \beta} \cdot \left(1 + \frac{4 \cdot C_x}{C_t \cdot S_2}\right)}$$

In this formula:
$\lambda$ = wavelength of sinusoidal motion
$s$ = distance between points of contact between wheel and rail in direction Y
$r$ = wheel radius
$\beta$ = conical inclination of wheel profile
$C_x$ = spring constant at the axle bearing in direction X
$C_t$ = spring constant of wheel in the circumferential direction at the tire surface.

In the present invention, the rigid wheel employed in the prior art type trucks has been replaced by a wheel having an elastic resilient interlayer, especially an interlayer of V-shape cross section. By changing this factor, the value $C_t$ is changed from infinitely great value to a smaller value, thus raising the expression within the parentheses which would normally be equal to about 1. The wave length of the sinusoidal motion is also increased by changing the value $C_x$ from a value of 0, in the case of known trucks for rail vehicles, to a higher value, In trucks of the prior art, the expression within the parentheses is normally equal to about 1 as the value $C_t$ is infinitely great while the values $C_x$, in the numerator, is equal to about 0. By varying both of these functions, the wave length of the sinusoidal motion is increased substantially so that it is between 32.8 feet (10m) and 98.1 feet (30m). This increase in the wave length provides substantial opposition by resilient forces to displacement of the wheel bearings in the direction X of travel. The increase in the wave length is increased by providing a torsional drag acting against rotation of the truck against the vertical Z-axis. This can be achieved by adjusting the expression within the parentheses under the radical so that it has a value greater than 1, which, in turn, is provided by making the value $C_x$ greater than 0 and giving the value $C_t$ a finite value, i.e., by joining the wheel crown to a wheel axle resiliently instead of rigidly. By combining a relatively high spring constant in the wheel set mounting in the direction of travel X with a resilient wheel set, an effect is thus achieved which is not produced by either characteristic itself. Stated differently, neither characteristic is replaced merely by increasing the value $C_x$ without the use of a resilient wheel set. Nor is such a characteristic produced by using a resilient wheel set without a sufficiently great value of $C_r$. In such cases, the wave length is not increased beyond the value which results when the expression within the parentheses under the radical is equal to 1.

By adjusting these values in accordance with the invention, the movement of the truck about the Z axis is stabilized. This stabilization is provided by the greater wave length $\lambda$ of the sinusoidal motion. The increase of this wave length minimizes the extent of rotation of the truck about the Z axis, for there results a low frequency of torsional vibration about the Z axis and accordingly, a low maximum torsional velocity in the torsional vibration.

What is claimed is:

1. In a high speed rail vehicle having a car body to which a truck is attached, said truck having a frame, at least two wheel sets, the wheels of which are joined by an axle, the ends of which are mounted in an axle bearing supporting said frame, each of said wheels having a wheel crown and a hub, the improvement which comprises in combination:
   A. Friction bearings disposed between the car body and said frame, which friction bearings restrain movement of said frame about its vertical axis until the friction between said friction bearing and said frame has been overcome;
   B. Said axle bearings having the shape of mutually inclined bearing surfaces and being composed of a resilient elastic material having high stiffness in the direction of travel; and
   C. A resilient elastic layer disposed in circumferential direction between said wheel crown and said hub.

2. A truck according to claim 1 wherein said resilient elastic layer disposed between said wheel crown and said hub has a V-shaped cross section.

3. A vehicle according to claim 2 wherein the legs of such V-shaped cross section which join one another are disposed inwardly toward the center of the wheel.

4. A vehicle according to claim 1 wherein said frame is the frame of a swivel truck of at least two axles.

5. A vehicle according to claim 1 wherein said frame joins the end of one rail vehicle to the end of another rail vehicle.

6. A vehicle according to claim 1 wherein the resilient elastic layer between said wheel crown and said hub is rubber.

7. A vehicle according to claim 1 wherein the resilient elastic layer of the mutually inclined bearing surfaces of the axle bearing is rubber.

* * * * *